United States Patent
Lin

(10) Patent No.: US 10,944,287 B2
(45) Date of Patent: Mar. 9, 2021

(54) AVR BYPASS RELAY WELDING DETECTION

(71) Applicant: SCHNEIDER ELECTRIC IT CORPORATION, West Kingston, RI (US)

(72) Inventor: Wei-Hsiang Lin, New Taipei (TW)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 172 days.

(21) Appl. No.: 16/025,278

(22) Filed: Jul. 2, 2018

(65) Prior Publication Data
US 2020/0006979 A1 Jan. 2, 2020

(51) Int. Cl.
*H02J 9/06* (2006.01)
*H01H 47/00* (2006.01)

(52) U.S. Cl.
CPC .......... *H02J 9/062* (2013.01); *H01H 47/002* (2013.01); *H01H 2047/003* (2013.01); *H02J 9/068* (2020.01)

(58) Field of Classification Search
CPC ........ H02J 9/062; H02J 9/068; H01H 47/002; H01H 2047/003
See application file for complete search history.

(56) References Cited

U.S. PATENT DOCUMENTS

| | | | |
|---|---|---|---|
| 5,602,462 A | 2/1997 | Stich et al. | |
| 6,218,744 B1 * | 4/2001 | Zahrte, Sr. | G16H 10/40 307/64 |
| 6,348,782 B1 * | 2/2002 | Oughton, Jr. | H02J 9/062 323/284 |
| 7,259,476 B2 * | 8/2007 | Frey | H02J 9/061 307/64 |
| 2006/0126240 A1 | 6/2006 | Unger et al. | |
| 2006/0238031 A1 * | 10/2006 | Frey | H02J 9/062 307/64 |

(Continued)

FOREIGN PATENT DOCUMENTS

EP 3113326 A1 1/2017

OTHER PUBLICATIONS

Extended European Search Report from corresponding European Application No. 19181964.8 dated Nov. 27, 2019.

*Primary Examiner* — Jared Fureman
*Assistant Examiner* — Emmanuel Dominique
(74) *Attorney, Agent, or Firm* — Lando & Anastasi, LLP

(57) ABSTRACT

According to one aspect, embodiments of the invention provide a UPS system comprising an input, an output, a neutral connection, an AVR transformer, relays configured to selectively couple a primary winding of the AVR transformer to the input and the output, a bypass relay configured to selectively couple the primary winding to the neutral connection, a DC/AC inverter, and a controller configured to operate the relays, the bypass relay, and the DC/AC inverter to provide output AC power derived from at least one of input AC power and backup DC power, wherein in a backup power mode, the controller is further configured to operate the DC/AC inverter to convert the backup DC power into AC power provided to a secondary winding of the AVR transformer, to monitor the AC output power, and to identify that the bypass relay has decoupled the primary winding from the neutral connection.

14 Claims, 5 Drawing Sheets

(56) References Cited

U.S. PATENT DOCUMENTS

| | | | | |
|---|---|---|---|---|
| 2010/0188066 A1* | 7/2010 | Rodenhiser | ............. | H02J 9/062 |
| | | | | 323/302 |
| 2015/0054516 A1* | 2/2015 | Iisaka | ....................... | B60L 3/04 |
| | | | | 324/418 |
| 2017/0012465 A1* | 1/2017 | Hu | ........................ | H02J 9/061 |
| 2017/0179759 A1* | 6/2017 | Johansen | ................ | H02J 9/062 |
| 2017/0346275 A1* | 11/2017 | Zhang | ................... | H02H 7/267 |

* cited by examiner

AVR BYPASS RELAY WELDING DETECTION

BACKGROUND

1. Field of Invention

The present invention relates generally to systems and methods for controlling an Uninterruptible Power Supply (UPS).

2. Discussion of Related Art

The use of power devices, such as uninterruptible power supplies (UPS), to provide regulated, uninterrupted power for sensitive and/or critical loads, such as computer systems and other data processing systems, is known. Known uninterruptible power supplies include on-line UPS's, off-line UPS's, line-interactive UPS's as well as others. On-line UPS's provide conditioned AC power as well as back-up AC power upon interruption of a primary source of AC power. Off-line UPS's typically do not provide conditioning of input AC power, but do provide back-up AC power upon interruption of the primary AC power source. Line-interactive UPS's are similar to off-line UPS's in that they switch to battery power when a blackout occurs but also typically include a multi-tap Automatic Voltage Regulation (AVR) transformer for regulating the output voltage provided by the UPS when a power line sag or swell occurs without draining the battery.

SUMMARY

Aspects in accord with the present invention are directed to an Uninterruptible Power Supply (UPS) system comprising an input to receive input AC power, an output to provide AC output power to a load, a neutral connection, an automatic voltage regulation (AVR) transformer having a primary winding and a secondary winding, a plurality of relays coupled to the input, the output, and the primary winding, the plurality of relays configured to selectively couple the primary winding to the input and the output, a bypass relay configured to selectively couple the primary winding of the AVR transformer to the neutral connection, a DC/AC inverter circuit coupled to the secondary winding and configured to be coupled to a backup power source and to receive backup DC power from the backup power source, and a controller configured to operate the plurality of relays, the bypass relay, and the DC/AC inverter circuit to provide the output AC power to the load derived from at least one of the input AC power and the backup DC power, wherein in a backup power mode of operation, the controller is further configured to operate the plurality of relays to decouple the AVR transformer from the input and couple the primary winding to the output, to operate the DC/AC inverter circuit to convert the backup DC power into converted AC power provided to the secondary winding, to monitor the AC output power, and to identify, based on the monitored AC output power, that the bypass relay has decoupled the primary winding from the neutral connection.

According to one embodiment, the UPS further comprises a user interface, wherein in response to identifying that the bypass relay has decoupled the primary winding from the neutral connection, the controller is further configured to transmit a notification to the user interface indicating that the bypass relay has decoupled the primary winding from the neutral connection. In another embodiment, the controller includes an interface configured to communicate with at least one external system, and wherein in response to identifying that the bypass relay has decoupled the primary winding from the neutral connection, the controller is further configured to transmit a notification to the at least one external system that the bypass relay has decoupled the primary winding from the neutral connection.

According to another embodiment, in monitoring the AC output power the controller is further configured to monitor an output voltage level and an output current level at the output. In one embodiment, the controller is further configured to compare the monitored output voltage level to an output voltage threshold. In another embodiment, in response to determining that the output voltage level is less than the output voltage threshold, the controller is further configured to compare the output current level to an output current threshold. In one embodiment, in response to determining that the output current level is less than the output current threshold, the controller is further configured to identify that the bypass relay has decoupled the primary winding from the neutral connection. In another embodiment, in response to determining that the output current level is greater than the output current threshold, the controller is further configured to identify that the load coupled to the output is short circuited.

According to one embodiment, the AVR transformer further comprises a first tap coupled to a first location of the primary winding and a second tap coupled to a second location of the primary winding, and wherein the plurality of relays comprises a line transfer relay configured to selectively couple the AVR transformer to the input, a boost relay configured to selectively couple the first tap to the line transfer relay, and a trim relay configured to selectively couple the second tap to the output. In one embodiment, in the backup power mode of operation, the controller is further configured to operate the line transfer relay to decouple the AVR transformer from the input, and to operate the trim relay to couple the second tap to the output.

According to another embodiment, in a boost mode of operation, the controller is further configured to operate the line transfer relay to couple the AVR transformer to the input, to operate the boost relay to couple the line transfer relay to the first tap, to operate the trim relay to couple the primary winding to the output, and to operate the bypass relay to couple the primary winding to the neutral connection, and wherein in the boost mode of operation, a voltage level at the output is greater than a voltage level at the input. In one embodiment, in the boost mode of operation, the controller is further configured to operate the trim relay to couple the second tap to the output.

According to one embodiment, in a trim mode of operation, the controller is further configured to operate the line transfer relay to couple the AVR transformer to the input, to operate the boost relay to decouple the first tap from the line transfer relay, to operate the trim relay to couple the second tap to the output, and to operate the bypass relay to couple the primary winding to the neutral connection, and wherein in the trim mode of operation, a voltage level at the output is less than a voltage level at the input.

Another aspect in accord with the present invention is directed to a method of identifying a welded relay condition in a line-interactive UPS comprising an input to receive input AC power, an output to provide AC output power to a load, a neutral connection, an automatic voltage regulation (AVR) transformer having a primary winding and a secondary winding, a plurality of relays coupled to the input, the output, and the primary winding, the plurality of relays configured to selectively couple the primary winding to the input and the output, a bypass relay configured to selectively couple the primary winding of the AVR transformer to the neutral connection, and a DC/AC inverter circuit coupled to the secondary winding and configured to be coupled to a backup power source and to receive backup DC power from the backup power source, wherein the method comprises acts of operating, in a backup power mode of operation, the plurality of relays, the bypass relay, and the DC/AC inverter circuit to provide the AC output power to the load derived from the backup DC power, monitoring the AC output power, and determining, based on the act of monitoring, that the line-interactive UPS is in the welded relay condition.

According to one embodiment, monitoring the AC output power comprises monitoring an output voltage level at the output, and monitoring an output current level at the output. In another embodiment, determining whether the line-interactive UPS is in the welded relay condition comprises comparing the output voltage level to an output voltage threshold, in response to determining that the output voltage level is less than the output voltage threshold, comparing the output current level to an output current threshold, and in response to determining that the output current level is less than the output current threshold, determining that the line-interactive UPS is in the welded relay condition. In one embodiment, in response to determining that the output current level is greater than the output current threshold, determining that the line-interactive UPS is in a short circuit condition. In another embodiment, the method further comprises operating, in a boost mode of operation, the plurality of relays and the bypass relay to generate a voltage level at the output which is greater than a voltage level at the input. In one embodiment, the method further comprises operating, in a trim mode of operation, the plurality of relays and the bypass relay to generate a voltage level at the output which is less than a voltage level at the input.

At least one aspect in accord with the present invention is directed to an Uninterruptible Power Supply (UPS) system comprising an input to receive input AC power, an output to provide AC output power to a load, a neutral connection, an automatic voltage regulation (AVR) transformer having a primary winding and a secondary winding, a plurality of relays coupled to the input, the output, and the primary winding, the plurality of relays configured to selectively couple the primary winding to the input and the output, a bypass relay configured to selectively couple the primary winding of the AVR transformer to the neutral connection, a DC/AC inverter circuit coupled to the secondary winding and configured to be coupled to a backup power source and to receive backup DC power from the backup power source, and means for operating the UPS system to provide the output AC power to the load derived from at least one of the input AC power and the backup DC power and for identifying that the bypass relay is in a position de-coupling the primary winding from the neutral connection when the UPS system is operated to provide the output AC power derived from the backup DC power.

BRIEF DESCRIPTION OF THE DRAWINGS

The accompanying drawings are not intended to be drawn to scale and in the drawings, each identical or nearly identical component that is illustrated in various figures is represented by a like numeral. For purposes of clarity, not every component may be labeled in every drawing. In the drawings.

DETAILED DESCRIPTION

Figure 1:
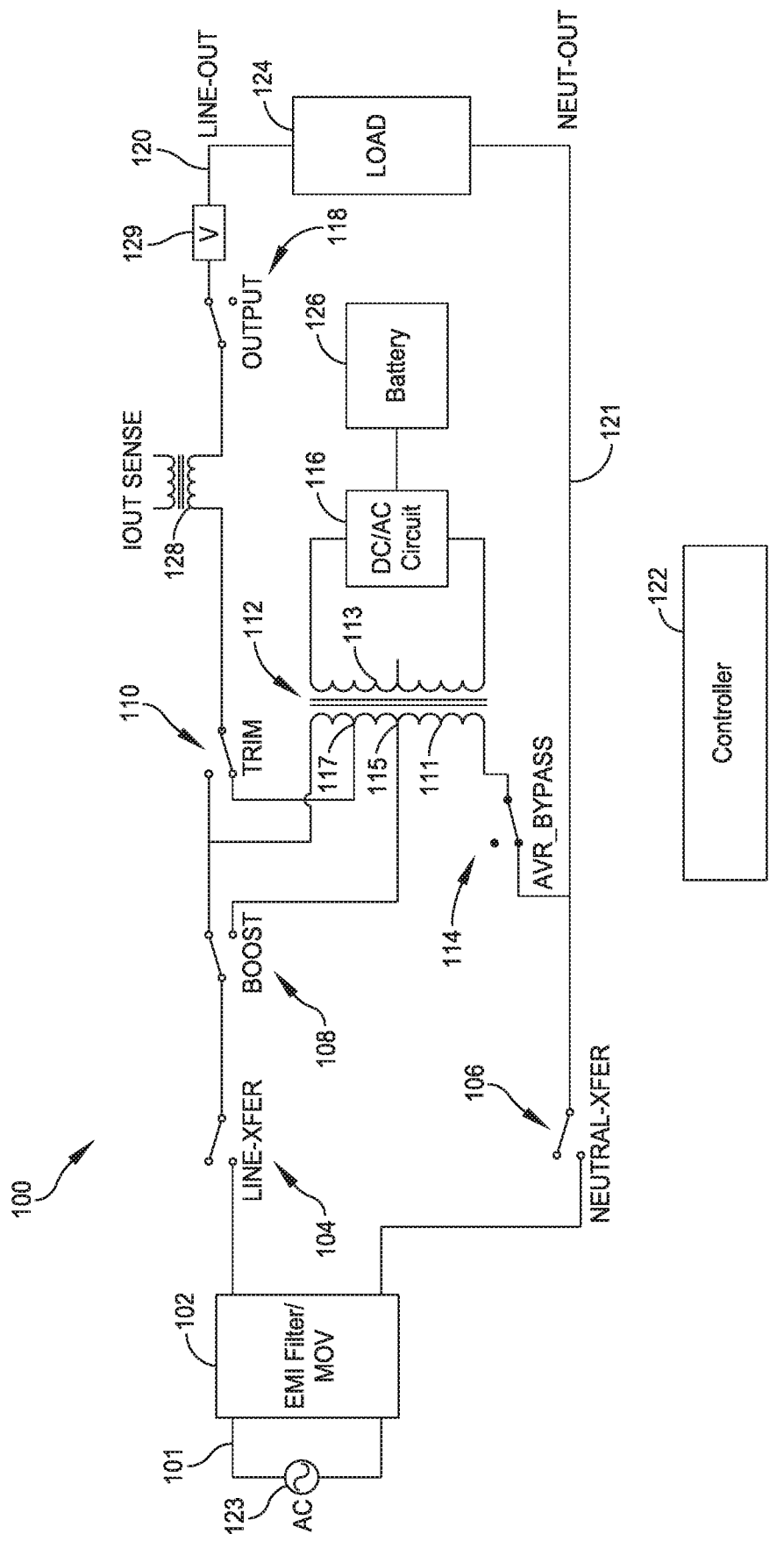
FIG. 1 is a diagram of a line-interactive UPS according to aspects described herein.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, a conventional line-interactive UPS includes an Automatic Voltage Regulation (AVR) transformer for regulating the output voltage provided by the UPS when a power line sag or swell condition occurs. In operation, the output voltage of a conventional line-interactive UPS is typically monitored to confirm that the desired output voltage is being provided by the line-interactive UPS and that a fault condition does not exist. For example, a determination that the output voltage of a conventional line-interactive UPS is abnormally low (e.g., below a threshold level) may lead to a conclusion by an operator of the UPS that a short circuit condition exists at the output of the line-interactive UPS (e.g., because of a shorted load). However, the abnormally low output voltage of the line-interactive UPS may actually be an indication that a different type of error condition exists in the line-interactive UPS.

For instance, where a line-interactive UPS includes a bypass relay that is configured to de-energize the AVR transformer when operation of the transformer is not desired (e.g., to prevent losses), contacts of the bypass relay can become welded together and the bypass relay can become stuck in an open state where the transformer remains de-energized even though the line-interactive UPS is attempting to regulate output voltage with the transformer. In such a situation, the voltage at the output of the line-interactive UPS may also be abnormally low (e.g., at a level close to zero which is similar to the level that occurs in the short circuit condition described above). However, if an operator of the UPS sees the abnormally low voltage due to the welded relay and takes corrective actions appropriate for a short circuit condition (e.g., removing every load and individually reconnecting each load to identify a faulty load), the corrective actions will not solve the welding fault. Valuable time can pass before the source of the fault is actually identified and appropriate corrective actions can be taken. Accordingly, a system and method is provided for accurately identifying a welded relay condition in a line-interactive UPS.

FIG. 1 is a block diagram of a line-interactive UPS 100. The line-interactive UPS 100 includes an input 101, a filter 102, a line transfer relay 104, a neutral transfer relay 106, a boost relay 108, a trim relay 110, an AVR transformer 112, an AVR bypass relay 114, a DC/AC inverter circuit 116, an output relay 118, an output 120, a neutral line 121, and a controller 122. The AVR transformer 112 includes a primary winding 111, a secondary winding 113, a first tap 115 coupled to a first location of the primary winding 111, and a second tap 117 coupled to a second location of the primary winding 111.

The input 101 is configured to be coupled to an AC power source 123. The filter 102 is coupled to the input 101. The line transfer relay 104 and the neutral transfer relay 106 are coupled to the filter 102. The boost relay 108 is coupled to the line transfer relay 104 and selectively coupled to either a first end of the primary winding 111 or the first tap 115. The trim relay 110 is coupled to the output relay 118 and is selectively coupled to either the first end of the primary winding 111 or the second tap 117. The output 120 is coupled to the output relay 118 and is also configured to be coupled to a load 124. The neutral transfer relay 106 is configured to be coupled to the load 124 via the neutral line 121. The AVR bypass relay 114 is coupled between the neutral line 121 and a second end of the primary winding 111. The secondary winding 113 is coupled to the DC/AC inverter circuit 116. The DC/AC inverter circuit 116 is configured to be coupled to a backup power source 126 (e.g., a battery). In one embodiment, the DC/AC inverter circuit 116 is a bidirectional inverter (i.e., can operate as both a DC/AC inverter and an AC/DC converter).

The controller 122 is configured to control the operational state of the line transfer relay 104, the neutral transfer relay 106, the boost relay 108, the trim relay 110, and the AVR bypass relay 114 by transmitting control signals to each relay. The controller 122 is also configured to control operation of the DC/AC inverter circuit 116 by transmitting control signals to the inverter circuit 116. In at least one embodiment, the controller 122 is coupled to a current sensor 128 (coupled between the trim relay 110 and the output relay 118) that is configured to output a measurement signal having a level corresponding to the level of current provided to the output 120 via the output relay 118. In at least one embodiment, the controller 122 is coupled to a voltage sensor 129 (coupled to the output 120) that is configured to output a measurement signal having a level corresponding to a voltage level at the output 120. In one embodiment, the controller 122 includes a single controller; however, in other embodiments, the controller 122 is a distributed system including more than one controller. The controller 122 can monitor and control the UPS 100 based on the measurement signal received from the current sensor 128, the voltage sensor 129, and/or additional measurement signals received from other sensors in the UPS 100.

In at least one embodiment, the controller 122 monitors the status of the UPS 100 by reading the output of a voltage sense circuit coupled to the input 101. In monitoring this sensor output, the controller 122 determines whether the input voltage provided to the UPS 100 by the power source 123 is in a normal or abnormal condition. The input voltage at the input 101 is in an abnormal condition if the input voltage is in a blackout, sag, or swell condition. Irrespective of the condition of the input voltage, the controller 122 operates the UPS 100 so that the voltage level at the output 120 is within a predetermined range, i.e. a nominal value plus or minus a given threshold.

For example, if the input voltage at the input 101 of the UPS 100 is at a normal level and AVR transformer regulation is not required, the controller 122 operates, in a pass through mode of operation, the line transfer relay 104 to couple the filter 102 to the boost relay 108, the boost relay to couple the line transfer relay 104 to the trim relay 110, the trim relay 110 to couple the boost relay 108 to the output relay 118, the output relay to couple the trim relay 110 to the output 120, the neutral transfer relay 106 to couple the filter 102 to the neutral line 121. In the pass through mode of operation, the first tap 115 and the second tap 117 are de-energized and the voltage level at the output 120 is maintained at a level equal to the voltage level at the input 101 without requiring regulation by the AVR transformer 112. Also, in the pass through mode of operation, the controller 122 operates the AVR bypass relay 114 to decouple the primary winding 111 of the AVR transformer 112 from the neutral line 121 such that the primary winding 111 is de-energized If the input voltage at the input 101 of the UPS 100 is in a sag or swell condition, regulation by the AVR transformer 112 is required to achieve the desired voltage level at the output 120, and the controller 122 operates the line transfer relay 104 to couple the filter 102 to the boost relay 108, the output relay to couple the trim relay 110 to the output 120, and the neutral transfer relay 106 to couple the filter 102 to the neutral line 121. In such an embodiment where AVR transformer regulation is required, the controller 122 also operates the boost relay 108 and the trim relay 110 to energize the first tap 115 and/or the second tap 117 such that the AVR transformer 112 generates a regulated output voltage at the output 120.

For example, if the input voltage at the input 101 of the UPS 100 is in a sag condition and the output voltage needs to be increased, the controller 122 adjusts the boost relay 108 and the trim relay 110 to a boost mode of operation. In the boost mode of operation, the boost relay 108 is operated to couple the line transfer relay 104 to the first tap 115 so that the first tap 115 is energized, and the trim relay 110 is operated to couple the second tap 117 to the output relay 118 so that the second tap 117 is energized. Upon the first tap 115 and second taps 117 being energized, current passes from the boost relay 108 to the trim relay 100 via the first tap 115, a portion of the primary winding 111, and the second tap 117, resulting in the voltage level at the output 120 being greater than the voltage level at the input 101. The increase in voltage between the output 120 and input 101 due to the AVR transformer 112 correlates to the turn ratio of the AVR transformer 112 which varies depending on where the primary winding 111 is tapped (determined by the boost relay 108, the trim relay 110, and corresponding taps 115, 117). For example, in the boost mode, the voltage level at the output 120 may be increased, in relation to the voltage level at the input 101, by a first ratio that is 1:1.15. In other embodiments, the first ratio may be configured differently.

If the output voltage needs to be increased by a greater ratio, the controller 122 can operate the trim relay 110 to couple the first end of the primary winding 111 to the output relay 118, so that that second tap 117 is de-energized and current passes from the boost relay 108 to the output relay 118 via the first tap 115, a second portion of the primary winding 111 (wherein the second portion of the primary winding is larger than the first portion), the first end of the primary winding 111, and the trim relay 110. By having current pass through a larger portion of the primary winding 111, the turn ratio of the AVR transformer 112 is effectively increased, resulting in a larger voltage at the output 120. For example, in the boost mode, the voltage level at the output 120 may be increased by a second ratio which is greater than the first ratio. In one embodiment, the second ratio may be double the value of the first ratio (e.g., 1:1.3). However, in other embodiments, the second ratio may be configured differently.

If the input voltage at the input 101 of the UPS 100 is in a swell condition and the output voltage needs to be reduced, the controller 122 adjusts the boost relay 108 and the trim relay 110 to a trim mode of operation. In the trim mode of operation, the boost relay 108 is operated to couple the line transfer relay 104 to the first end of the primary winding 111 so that the first tap 115 is de-energized, and the trim relay 110 is operated to couple the second tap 117 to the output relay 118 so that the second tap 117 is energized. Upon the second tap being energized, current passes (in an opposite direction to that of the boost mode) from the boost relay to the trim relay 110 via the first end of the primary winding 111, a portion of the primary winding 111, and the second tap 117, resulting in the voltage level at the output 120 being less than the voltage level at the input 101. The decrease of voltage between the output 120 and input 101 due to the AVR transformer 122 is directly correlated to the turn ratio of the AVR transformer 12. For example, in the trim mode, the voltage at the output 120 may be decreased, in relation to the voltage at the input 101, by a ratio of 1.15:1. In other embodiments, the ratio in the trim mode can be configured differently.

In the boost and trim modes of operation, the controller 122 operates the AVR bypass relay 114 to couple the primary winding 111 to the neutral line to energize the primary winding 111. According to one embodiment, during the boost and trim modes of operation, voltage across the primary winding 111 generates a voltage across the secondary winding 113, and the controller 122 operates the bidirectional DC/AC inverter circuit to convert the voltage across the secondary winding 113 into a DC voltage to charge the backup power source 126 (e.g., battery).

If the input voltage at the input 101 fails (i.e., is in a blackout condition), the controller 122 activates the line transfer relay 104 and the neutral transfer relay 106 to de-couple the AVR transformer 112 from the input 101, and operates the boost relay 108 and the trim relay 110 in a backup power mode of operation. In the backup power mode of operation, the controller 122 operates the boost relay 108 to couple the line transfer relay 104 to the first end of the primary winding 111, and the trim relay to couple the second tap 117 to the output relay 118 to energize the second tap 117. In the backup power mode of operation, DC power from the backup power source 126 is provided to the DC/AC inverter 116 and the controller 122 operates the DC/AC inverter 116 to convert the received DC power into converted AC power. The converted AC power from the DC/AC inverter 116 is provided to the secondary winding 113, which generates a corresponding voltage across the primary winding 111. The voltage across the primary winding 115 is provided to the load 124 via the trim relay 110, output relay 118, and output 120.

Figure 2:
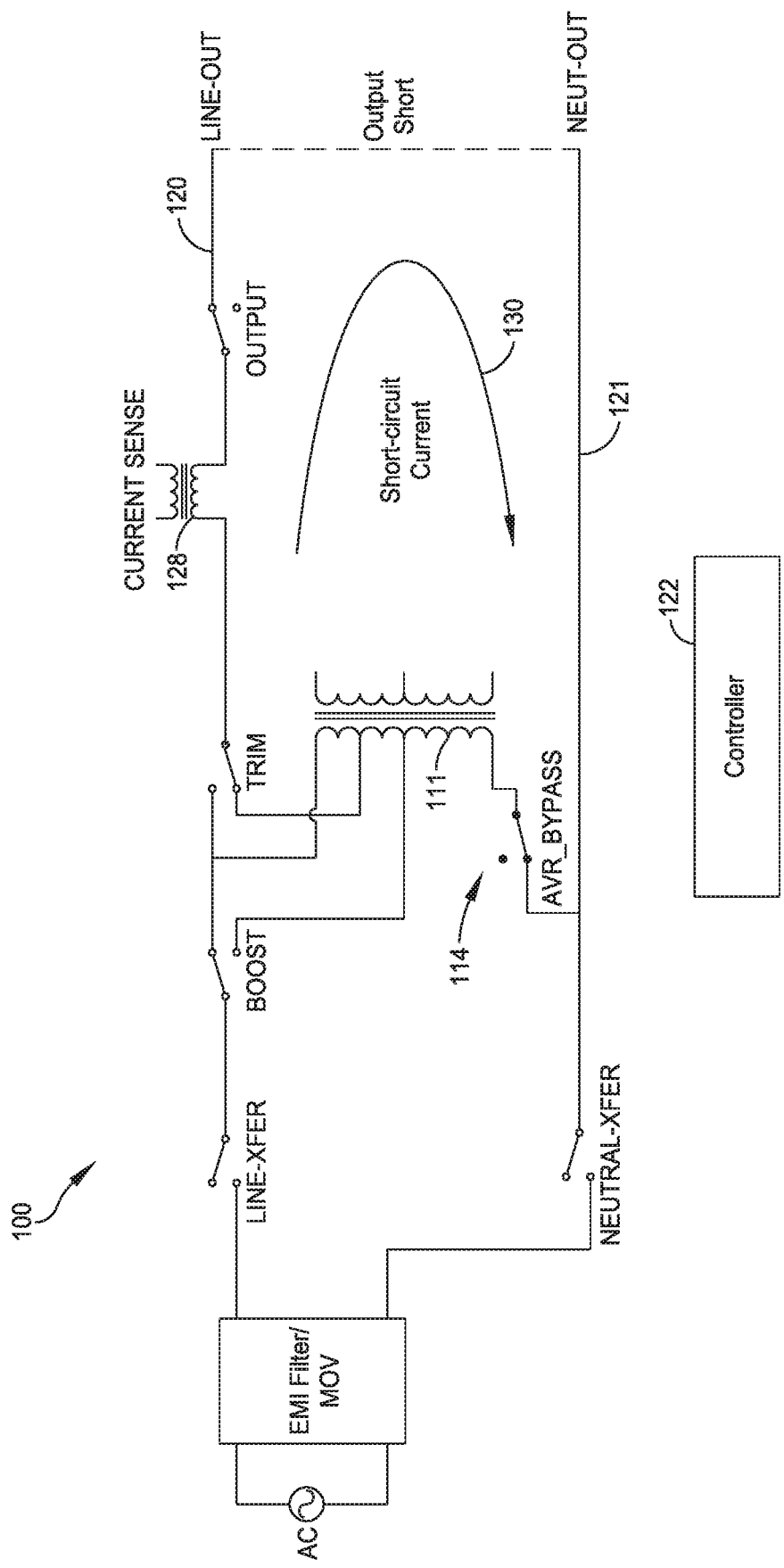
FIG. 2 is a diagram of a line-interactive UPS in a short circuit condition according to aspects described herein.

As discussed above, a short circuit condition at the output 120 of the UPS 100 can exist due to a faulty load 124. For example, FIG. 2 illustrates the line-interactive UPS 100 in a short-circuit condition during the backup power mode of operation. For ease of illustration, the DC/AC inverter circuit 116 and battery 126 have been removed from FIG. 2. As shown in FIG. 2, when a short circuit condition exists at the output 120 (due to a short in the load 124) in the backup power mode of operation, a relatively large current 130 between the output 120 and the neutral line 121 exists and the voltage at the output 120 drops to a very low level (e.g., close to zero).

Figure 3:
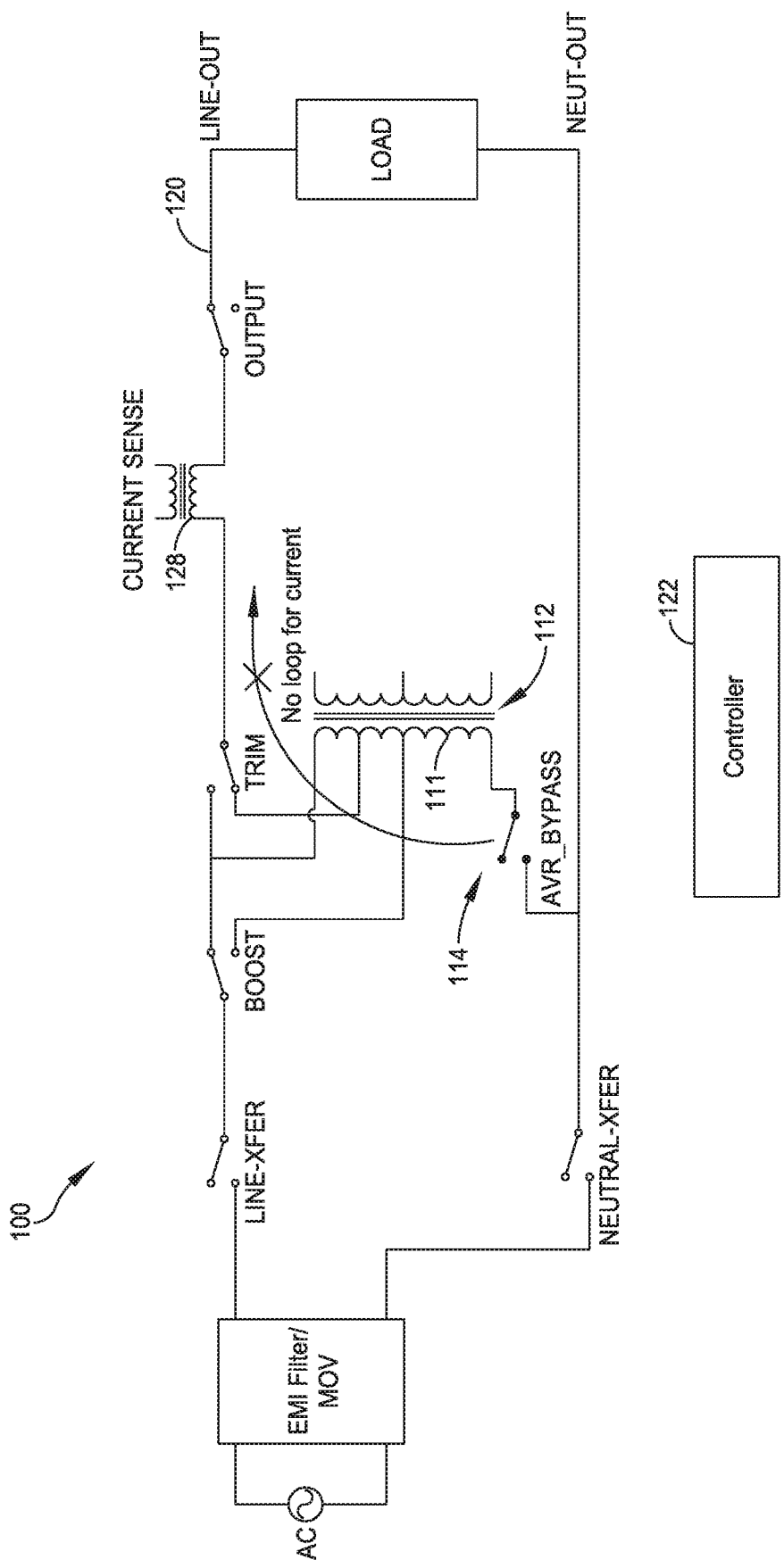
FIG. 3 is a diagram of a line-interactive UPS in a welded relay condition according to aspects described herein.

As also discussed above, a welded relay condition of the UPS 100 can occur when contacts of the AVR bypass relay 114 become welded together and the AVR bypass relay 114 is stuck in an open state where the primary winding 111 remains de-energized even though the line-interactive UPS 100 is attempting to provide a regulated output voltage. For example, FIG. 3 illustrates the line-interactive UPS 100 in a welded relay condition during the backup power mode of operation. For ease of illustration, the DC/AC inverter circuit 116 and battery 126 have been removed from FIG. 3. As shown in FIG. 3, when the AVR bypass relay 114 is welded open in the backup power mode of operation, the primary winding is de-energized, the voltage at the output drops to a very low level (e.g., close to zero), and there is no current between the AVR transformer 112 and the output 120.

To accurately identify faults in the UPS 100 during the backup power mode of operation, the controller 122 monitors voltage at the output 120 (e.g., via the voltage sensor 129 coupled to the output 120) and also current through the output 120 (e.g., via the current sensor 128). In response to determining that the voltage at the output is very low (e.g., below an output voltage threshold close to zero), the controller 122 identifies that either a short circuit condition or a welded relay condition exists in the UPS 100 as both conditions result in a similarly low voltage at the output 120. To distinguish between the two conditions, the controller 122 also analyzes the current through the output 120. In response to a determination that the current through the output 120 is relatively large (e.g., greater than an output current threshold), the controller determines that a short circuit condition exists in the UPS 100. In response to a determination that the current through the output 120 is not relatively large (e.g., less than an output current threshold), the controller determines that a welded relay condition exists in the UPS 100.

By monitoring both voltage and current at the output 120, the controller can accurately identify whether a short circuit condition or a welded relay condition exists in the UPS 100, without requiring a more thorough physical inspection of the UPS 100 by a technician. The controller 122 can provide an indication to a user (e.g., via a user interface or via a transmission to an external system operated by the user) notifying the user of the type of fault. By more accurately identifying the type of fault in the UPS 100, appropriate corrective measures can be taken by the user to fix the UPS 100.

Figure 4:
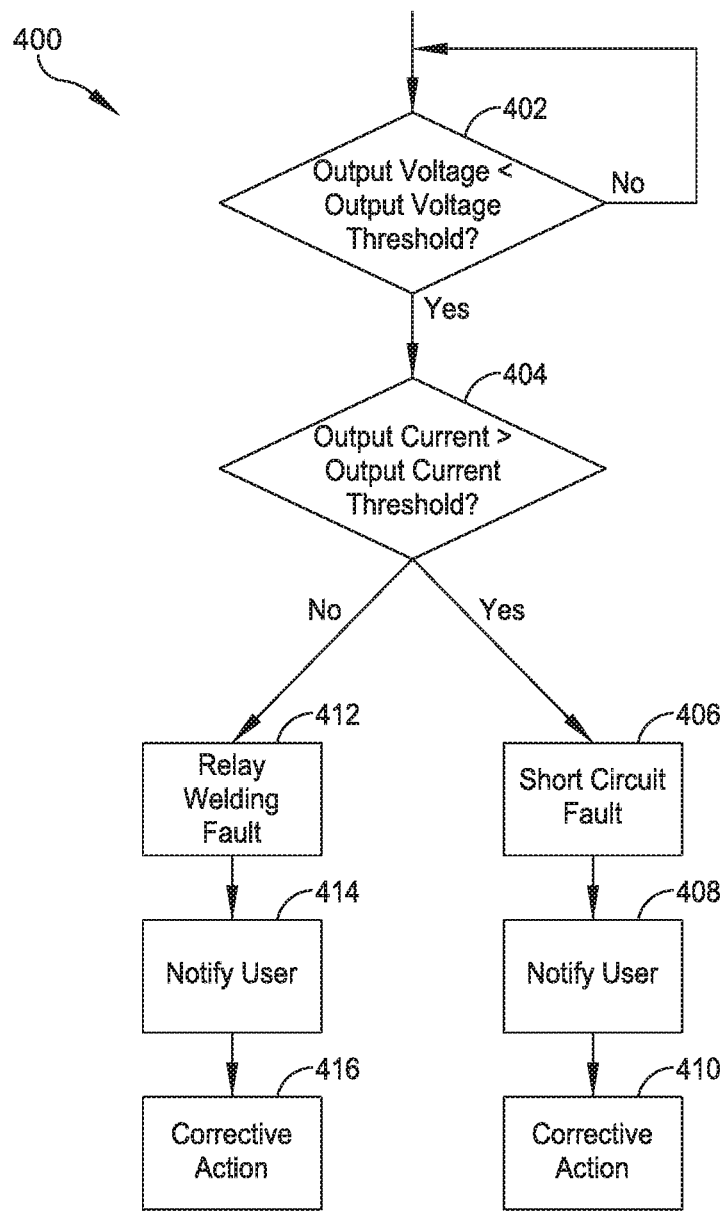
FIG. 4 is a flow chart illustrating operation of a controller according to aspects described herein.

FIG. 4 is a flow diagram 400 illustrating operation of the controller 122. At block 402, the controller 122 monitors the output voltage of the UPS 100 and compares the output voltage to an output voltage threshold. In response to a determination that the output voltage is greater than the output voltage threshold, the controller 122 continues to monitor the output voltage of the UPS 100.

In response to a determination that the output voltage is less than the output voltage threshold, at block 404 the controller 122 monitors the output current of the UPS 100 (e.g., via the current sensor 128) and compares the output current to an output current threshold. In response to a determination that the output current threshold is greater than the output current threshold, at block 406 the controller 122 identifies that the UPS 100 is in a short circuit condition. At block 408, the controller 122 notifies the user (e.g., via a user interface or a transmission to an external system operated by the user) of the existence of the short circuit condition. At block 410, the user can take appropriate corrective action to resolve a short circuit condition (e.g., removing every load connected to the UPS 100 and individually reconnecting each load to identify the faulty load).

In response to a determination that the output current threshold is less than the output current threshold, at block 412 the controller 122 identifies that the UPS 100 is in a welded relay condition. At block 441, the controller 122 notifies the user (e.g., via a user interface or a transmission to an external system operated by the user) of the existence of the welded relay condition. At block 160, the user can take appropriate corrective action to resolve a welded relay condition (e.g., the replacement of the AVR bypass relay 114).

Figure 5:
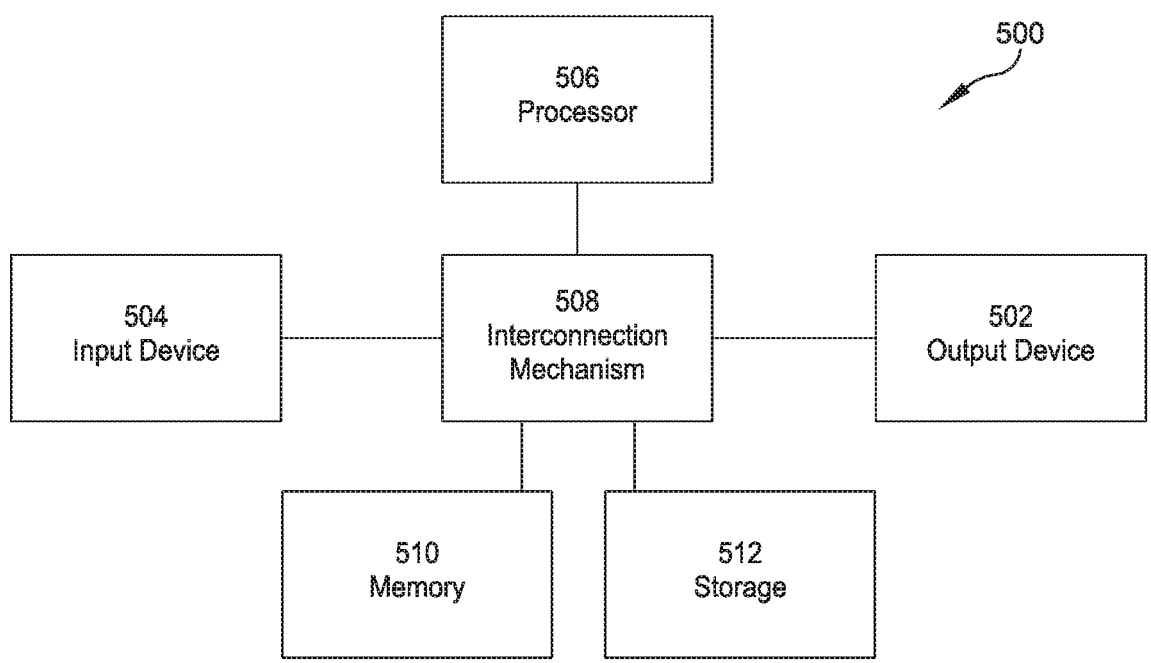
FIG. 5 is a block diagram of a system upon which various embodiments of the invention may be implemented.

FIG. 5 illustrates an example block diagram of computing components forming a system 500 which may be configured to implement one or more aspects disclosed herein. For example, the system 500 may be communicatively coupled to the controller 122 or included within the controller 122. The system 500 may also be configured to operate a line-interactive UPS as discussed above.

The system 500 may include for example a computing platform such as those based on Intel PENTIUM-type processor, Motorola PowerPC, Sun UltraSPARC, Texas Instruments-DSP, Hewlett-Packard PA-RISC processors, or any other type of processor. System 500 may include specially-programmed, special-purpose hardware, for example, an application-specific integrated circuit (ASIC). Various aspects of the present disclosure may be implemented as specialized software executing on the system 500 such as that shown in FIG. 5.

The system 500 may include a processor/ASIC 506 connected to one or more memory devices 510, such as a disk drive, memory, flash memory or other device for storing data. Memory 510 may be used for storing programs and data during operation of the system 500. Components of the computer system 500 may be coupled by an interconnection mechanism 508, which may include one or more buses (e.g., between components that are integrated within a same machine) and/or a network (e.g., between components that reside on separate machines). The interconnection mechanism 508 enables communications (e.g., data, instructions) to be exchanged between components of the system 500. The system 500 also includes one or more input devices 504, which may include for example, a keyboard or a touch screen. The system 500 includes one or more output devices 502, which may include for example a display or user interface. In addition, the computer system 500 may contain one or more interfaces that may connect the computer system 500 to a communication network, in addition or as an alternative to the interconnection mechanism 508

The system 500 may include a storage system 512, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor may cause data to be read from the nonvolatile medium into another memory 510 that allows for faster access to the information by the processor/ASIC than does the medium. This memory 510 may be a volatile, random access memory such as a dynamic random access memory (DRAM) or static memory (SRAM). It may be located in storage system 512 or in memory system 510. The processor 506 may manipulate the data within the integrated circuit memory 510 and then copy the data to the storage 512 after processing is completed. A variety of mechanisms are known for managing data movement between storage 512 and the integrated circuit memory element 510, and the disclosure is not limited thereto. The disclosure is not limited to a particular memory system 510 or a storage system 512.

The system 500 may include a computer platform that is programmable using a high-level computer programming language. The system 500 may be also implemented using specially programmed, special purpose hardware, e.g. an ASIC. The system 500 may include a processor 506, which may be a commercially available processor such as the well-known Pentium class processor available from the Intel Corporation. Many other processors are available. The processor 506 may execute an operating system which may be, for example, a Windows operating system available from the Microsoft Corporation, MAC OS System X available from Apple Computer, the Solaris Operating System available from Sun Microsystems, or UNIX and/or LINUX available from various sources. Many other operating systems may be used.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

As described above, a system and method is provided for accurately identifying a welded relay condition in a line-interactive UPS without requiring the physical inspection of internal components of the line-interactive UPS. By monitoring both voltage and current at the output of a line-interactive UPS, the UPS can more accurately identify whether a short circuit condition or a welded relay condition exists in the UPS. By more accurately identifying the type of fault in the UPS, appropriate corrective measures can be taken by the user to fix the UPS.

As described herein, the system and method for identifying a welded relay condition is utilized in a line-interactive UPS; however, in other embodiments, the system and method can be implemented with other types of UPS's or power systems. As also described herein, the system and method for identifying a welded relay condition is utilized in the backup power mode of operation of a line-interactive UPS; however, in other embodiments, the system can be utilized to identify a welded relay condition in another mode of operation of the UPS.

As described herein, the UPS includes a bidirectional DC/AC inverter circuit for both charging a backup power source and converting DC power from the backup power source into AC power. However, in at least one embodiment, the UPS includes both the DC/AC inverter for converting DC power from the backup power source into AC power and a separate AC/DC converter (e.g., charger) for charging the backup power source.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only

What is claimed is:

1. An Uninterruptible Power Supply (UPS) system comprising:
   an input to receive input AC power;
   an output to provide AC output power to a load;
   a neutral connection;
   an automatic voltage regulation (AVR) transformer having a primary winding and a secondary winding;
   a plurality of relays coupled to the input, the output, and the primary winding, the plurality of relays configured to selectively couple the primary winding to the input and the output;
   a bypass relay configured to selectively couple the primary winding of the AVR transformer to the neutral connection;
   a DC/AC inverter circuit coupled to the secondary winding and configured to be coupled to a backup power source and to receive backup DC power from the backup power source; and
   a controller configured to operate the plurality of relays, the bypass relay, and the DC/AC inverter circuit to provide the output AC power to the load derived from at least one of the input AC power and the backup DC power,
   wherein in a backup power mode of operation, the controller is further configured to operate the plurality of relays to decouple the AVR transformer from the input and couple the primary winding to the output, to operate the DC/AC inverter circuit to convert the backup DC power into converted AC power provided to the secondary winding, to monitor the AC output power, and to identify, based on the monitored AC output power, that the bypass relay has decoupled the primary winding from the neutral connection in a welded relay condition,
   wherein in monitoring the AC output power the controller is further configured to monitor an output voltage level and an output current level at the output,
   wherein the controller is further configured to compare the monitored output voltage level to an output voltage threshold,
   wherein in response to determining that the output voltage level is less than the output voltage threshold, the controller is further configured to compare the output current level to an output current threshold, and
   wherein in response to determining that the output current level is less than the output current threshold, the controller is further configured to identify that the bypass relay has decoupled the primary winding from the neutral connection in the welded relay condition.

2. The UPS of claim 1, further comprising a user interface, wherein in response to identifying that the bypass relay has decoupled the primary winding from the neutral connection, the controller is further configured to transmit a notification to the user interface indicating that the bypass relay has decoupled the primary winding from the neutral connection.

3. The UPS of claim 1, wherein the controller includes an interface configured to communicate with at least one external system, and wherein in response to identifying that the bypass relay has decoupled the primary winding from the neutral connection, the controller is further configured to transmit a notification to the at least one external system that the bypass relay has decoupled the primary winding from the neutral connection.

4. The UPS of claim 1, wherein in response to determining that the output current level is greater than the output current threshold, the controller is further configured to identify that the load coupled to the output is short circuited.

5. The UPS of claim 1, wherein the AVR transformer further comprises a first tap coupled to a first location of the primary winding and a second tap coupled to a second location of the primary winding, and wherein the plurality of relays comprises:
   a line transfer relay configured to selectively couple the AVR transformer to the input;
   a boost relay configured to selectively couple the first tap to the line transfer relay; and
   a trim relay configured to selectively couple the second tap to the output.

6. The UPS of claim 5, wherein in the backup power mode of operation, the controller is further configured to operate the line transfer relay to decouple the AVR transformer from the input, and to operate the trim relay to couple the second tap to the output.

7. The UPS of claim 6, wherein in a boost mode of operation, the controller is further configured to operate the line transfer relay to couple the AVR transformer to the input, to operate the boost relay to couple the line transfer relay to the first tap, to operate the trim relay to couple the primary winding to the output, and to operate the bypass relay to couple the primary winding to the neutral connection, and wherein in the boost mode of operation, a voltage level at the output is greater than a voltage level at the input.

8. The UPS of claim 7, wherein in the boost mode of operation, the controller is further configured to operate the trim relay to couple the second tap to the output.

9. The UPS of claim 6, wherein in a trim mode of operation, the controller is further configured to operate the line transfer relay to couple the AVR transformer to the input, to operate the boost relay to decouple the first tap from the line transfer relay, to operate the trim relay to couple the second tap to the output, and to operate the bypass relay to couple the primary winding to the neutral connection, and wherein in the trim mode of operation, a voltage level at the output is less than a voltage level at the input.

10. A method of identifying a welded relay condition in a line-interactive UPS comprising an input to receive input AC power, an output to provide AC output power to a load,
   a neutral connection, an automatic voltage regulation (AVR) transformer having a primary winding and a secondary winding, a plurality of relays coupled to the input, the output, and the primary winding, the plurality of relays configured to selectively couple the primary winding to the input and the output, a bypass relay configured to selectively couple the primary winding of the AVR transformer to the neutral connection, and a DC/AC inverter circuit coupled to the secondary winding and configured to be coupled to a backup power source and to receive backup DC power from the backup power source, wherein the method comprises acts of:

operating, in a backup power mode of operation, the plurality of relays, the bypass relay, and the DC/AC inverter circuit to provide the AC output power to the load derived from the backup DC power;

monitoring the AC output power; and determining, based on the act of monitoring, that the line-interactive UPS is in the welded relay condition, wherein monitoring the AC output power comprises:
  monitoring an output voltage level at the output; and
  monitoring an output current level at the output; and wherein determining whether the line-interactive UPS is in the welded relay condition comprises:
  comparing the output voltage level to an output voltage threshold;
  in response to determining that the output voltage level is less than the output voltage threshold, comparing the output current level to an output current threshold; and
  in response to determining that the output current level is less than the output current threshold, determining that the bypass relay is in the welded relay condition.

11. The method of claim 10, wherein in response to determining that the output current level is greater than the output current threshold, determining that the line-interactive UPS is in a short circuit condition.

12. The method of claim 10, further comprising operating, in a boost mode of operation, the plurality of relays and the bypass relay to generate a voltage level at the output which is greater than a voltage level at the input.

13. The method of claim 10, further comprising operating, in a trim mode of operation, the plurality of relays and the bypass relay to generate a voltage level at the output which is less than a voltage level at the input.

14. An Uninterruptible Power Supply (UPS) system comprising:
  an input to receive input AC power;
  an output to provide AC output power to a load;
  a neutral connection;
  an automatic voltage regulation (AVR) transformer having a primary winding and a secondary winding;
  a plurality of relays coupled to the input, the output, and the primary winding, the plurality of relays configured to selectively couple the primary winding to the input and the output;
  a bypass relay configured to selectively couple the primary winding of the AVR transformer to the neutral connection;
  a DC/AC inverter circuit coupled to the secondary winding and configured to be coupled to a backup power source and to receive backup DC power from the backup power source; and
  means for operating the UPS system to provide the output AC power to the load derived from at least one of the input AC power and the backup DC power, monitoring an output voltage level and an output current level at the output, comparing the monitored output voltage level to an output voltage threshold, in response to determining that the output voltage level is less than the output voltage threshold, comparing the output current level to an output current threshold, and in response to determining that the output current level is less than the output current threshold, identifying that the bypass relay has decoupled the primary winding from the neutral connection in a welded relay condition.

* * * * *